(12) United States Patent
Saito

(10) Patent No.: US 11,628,797 B2
(45) Date of Patent: Apr. 18, 2023

(54) AIRBAG

(71) Applicant: NIHON PLAST CO., LTD., Fujinomiya (JP)

(72) Inventor: Hideaki Saito, Shizuoka (JP)

(73) Assignee: NIHON PLAST CO., LTD., Fujinomiya (JP)

(*) Notice: Subject to any disclaimer, the term of this patent is extended or adjusted under 35 U.S.C. 154(b) by 0 days.

(21) Appl. No.: 17/343,790

(22) Filed: Jun. 10, 2021

(65) Prior Publication Data

US 2021/0394699 A1 Dec. 23, 2021

(30) Foreign Application Priority Data

Jun. 23, 2020 (JP) .............................. JP2020-107517

(51) Int. Cl.
*B60R 21/239* (2006.01)
*B60R 21/2338* (2011.01)

(52) U.S. Cl.
CPC ........ *B60R 21/239* (2013.01); *B60R 21/2338* (2013.01); *B60R 2021/23382* (2013.01)

(58) Field of Classification Search
CPC .............. B60R 21/239; B60R 21/2338; B60R 2021/23382; B60R 2021/2395
See application file for complete search history.

(56) References Cited

U.S. PATENT DOCUMENTS

| | | | | |
|---|---|---|---|---|
| 8,070,183 B2* | 12/2011 | Kumagai | ............ | B60R 21/2338 280/736 |
| 8,371,612 B2* | 2/2013 | Williams | ............ | B60R 21/2338 280/743.2 |
| 9,079,559 B2* | 7/2015 | Iwamoto | ............. | B60R 21/2338 |
| 9,108,590 B2* | 8/2015 | Williams | ............... | B60R 21/239 |
| 9,126,566 B2* | 9/2015 | Jeong | ................. | B60R 21/2346 |
| 9,403,504 B2* | 8/2016 | Umehara | .............. | B60R 21/239 |
| 10,946,828 B2* | 3/2021 | Huelke | ................. | B60R 21/239 |
| 2009/0289444 A1* | 11/2009 | Keshavaraj | ........... | B60R 21/239 280/736 |

FOREIGN PATENT DOCUMENTS

JP 2002-347549 12/2002

* cited by examiner

*Primary Examiner* — Paul N Dickson
*Assistant Examiner* — Tiffany L Webb
(74) *Attorney, Agent, or Firm* — Amin, Turocy & Watson, LLP

(57) ABSTRACT

There is provided an airbag in which there are fewer restrictions in a place for setting a tension member and a place for setting a vent hole. Airbag (10) of the present invention has bag-shaped airbag main body (20), tension member (30, 30a, 30b) disposed inside airbag main body (20), and vent hole (50) provided in airbag main body (20). In two-dimensional view in which an inner side of inflated and deployed airbag main body (20) is viewed from a direction orthogonal to vent hole (50) via vent hole (50), tension member (30, 30a, 30b) has overlapping portion (35) disposed at a position overlapping vent hole (50), and a dimension of at least a part of overlapping portion (35) in an orthogonal direction is smaller than a gap of a portion of vent hole (50), which corresponds to overlapping portion (35), in the orthogonal direction.

4 Claims, 5 Drawing Sheets

AIRBAG

CROSS REFERENCE TO RELATED APPLICATIONS

This application is entitled to and claims the benefit of Japanese Patent Application No. 2020-107517 filed on Jun. 23, 2020, the disclosure of which including the specification, drawings and abstract is incorporated herein by reference in its entirety.

TECHNICAL FIELD

The present invention relates to an airbag mounted on a vehicle such as an automobile.

BACKGROUND ART

An airbag apparatus that alleviates a shock applied to an occupant to protect the occupant when a vehicle such as an automobile undergoes a collision is known in the related art. In general, the airbag apparatus has an inflator that supplies a gas and an airbag that includes a bag-shaped airbag main body folded in a predetermined shape.

An airbag, in which a strap (tension member) is provided on an inner side of a bag-shaped airbag main body from a base end side to a bulging tip side of the airbag main body, is disclosed in Japanese Patent Application Laid-Open No. 2002-347549 (PTL 1).

As the strap described above is attached in the airbag main body in the airbag of PTL 1, when a gas flows into the airbag main body and the airbag main body is inflated and deployed, the strap is pulled by the airbag main body and becomes tense in the airbag main body, and accordingly, the deployed shape (inflated shape) of the airbag main body is regulated.

In particular, in the airbag of PTL 1, the strap is fixed and supported by the airbag main body at a portion between the base end side and the bulging tip side of the airbag main body. According to PTL 1, as the strap is supported as described above, reaction caused by the tension of the strap can be dispersed to reduce the vibration of the airbag main body. In addition, a degree of freedom in selecting the deployed shape of the airbag main body can be increased, and better deployment control can be realized.

CITATION LIST

Patent Literature

PTL 1
Japanese Patent Application Laid-Open No. 2002-347549

SUMMARY OF INVENTION

Technical Problem

In the airbag described in PTL 1, the strap that regulates the deployed shape of the airbag main body has a constant width, and the strap is annularly attached to the inner side of the airbag main body to follow an inner peripheral surface of the inflated and deployed airbag main body.

A circular opening portion which is called a vent hole is often provided in the airbag main body of the airbag. As such a vent hole is provided, when the airbag main body is inflated and deployed and an occupant has come into contact with the airbag main body, a gas supplied inside the airbag main body is discharged from the vent hole. Accordingly, energy generated when the occupant has come into contact with the airbag main body is absorbed, and thus a shock to the occupant can be alleviated.

On the other hand, in a case where the vent hole described above is provided in the airbag main body of the airbag of PTL 1, when the strap annularly provided on the inner side of the airbag main body is disposed to overlap the position of the vent hole, there is a possibility that the vent hole is blocked by the strap and the exhaust performance of the vent hole is impaired. For this reason, in a case where both of the strap (tension member) and the vent hole are provided in the airbag main body, a place for setting the strap and a place for setting the vent hole are restricted, which is thought to be causing a decrease in a degree of freedom in designing an airbag.

The present invention is devised in view of the problems of the related art, and an object thereof is provide an airbag in which there are fewer restrictions in a place for setting a tension member and a place for setting a vent hole.

Solution to Problem

According to an aspect of the present invention, in order to achieve the object, there is provided an airbag that is mounted on a vehicle. The airbag includes a bag-shaped airbag main body that is inflated as a gas flows into the airbag main body, at least one tension member that is disposed inside the airbag main body and regulates an inflated shape of the airbag main body, and at least one vent hole that is provided in the airbag main body and through which the gas in the airbag main body is discharged. In two-dimensional view when an inner side of the inflated and deployed airbag main body is viewed from a direction orthogonal to the vent hole via the vent hole, the tension member has an overlapping portion that is disposed at a position overlapping the vent hole, and in a case where a direction orthogonal to a length direction of the tension member is an orthogonal direction, a dimension of at least a part of the overlapping portion in the orthogonal direction is smaller than a gap of a portion of the vent hole, which corresponds to the overlapping portion, in the orthogonal direction.

In the airbag according to the present invention, it is preferable that the entire overlapping portion is formed such that a dimension in the orthogonal direction is smaller than a maximum gap of the vent hole in the orthogonal direction. In addition, in the airbag of the present invention, it is preferable that the overlapping portion is included in a narrow portion that has a small dimension in the orthogonal direction in the tension member.

Further, in the airbag of the present invention, it is preferable that the tension member is formed by a belt-shaped member having flexibility, and the narrow portion is formed such that a part of the belt-shaped member is folded in a width direction of the belt-shaped member and both end portions of the belt-shaped member in the width direction are overlapped with and fixed to each other at a folded portion.

In addition, in the airbag of the present invention, the tension member may be formed by a belt-shaped member having flexibility, and the narrow portion may be formed by providing an opening portion in a part of the belt-shaped member.

Advantageous Effects of Invention

In the airbag of the present invention, there are fewer restrictions in a place for setting the tension member and a place for setting the vent hole, thus a degree of freedom in designing an airbag can be improved.

DESCRIPTION OF EMBODIMENTS

Hereinafter, a suitable embodiment of the present invention will be described by giving an example with reference to the drawings. The present invention is not limited to the embodiment to be described below, and various changes are possible insofar as the embodiment has substantially the same configuration as the present invention and exhibits the same operational effects.

For example, although an airbag to be described in the example below is an airbag used in an airbag apparatus for a driver's seat, which is provided in a steering wheel of an automobile, it is also possible to apply the present invention in the same manner to an airbag used in other airbag apparatuses, such as an airbag apparatus for a passenger seat.

EXAMPLE

Figure 1:
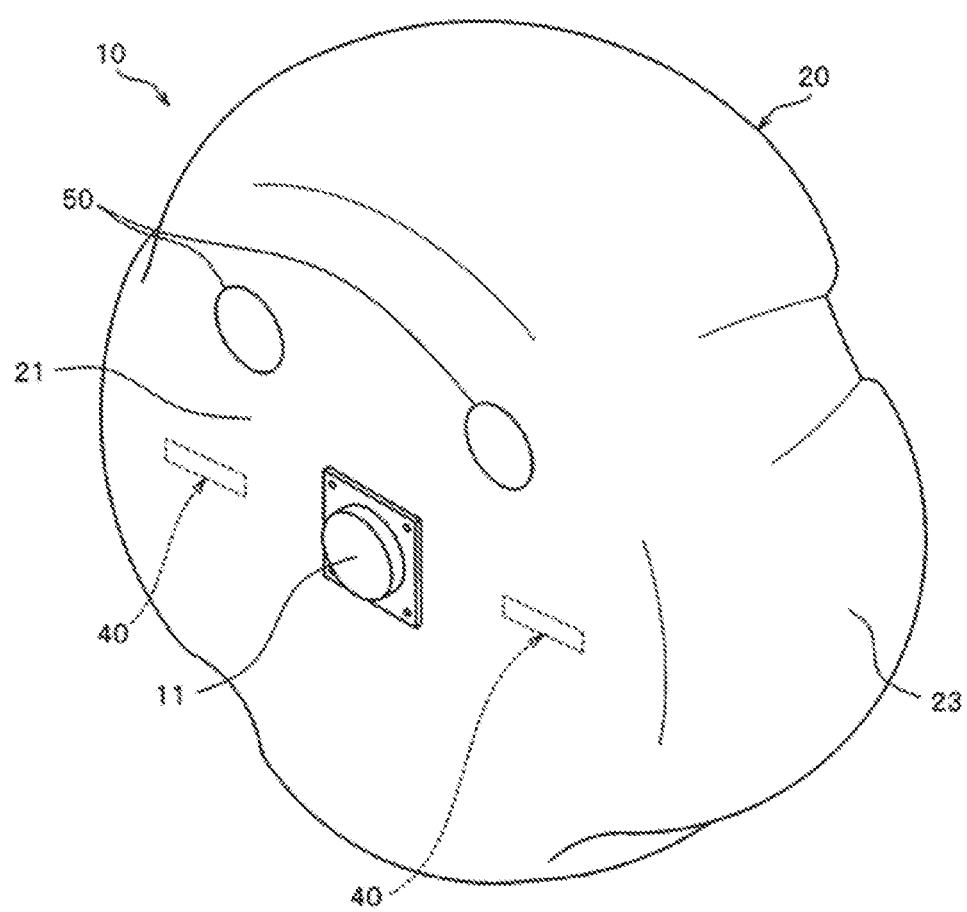
FIG. 1 is a perspective view schematically showing an airbag according to an example of the present invention.
Figure 2:
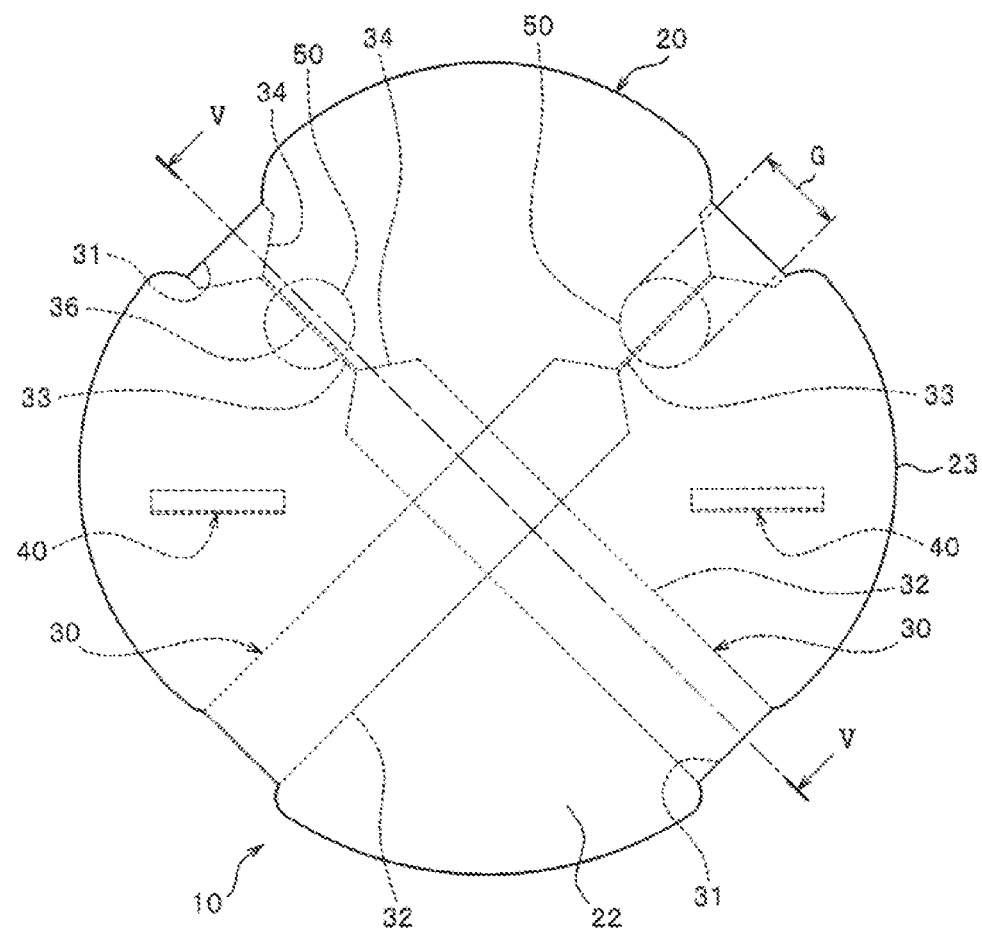
FIG. 2 is a rear view of the airbag when the airbag shown in FIG. 1 is viewed from an occupant side.
Figure 3:
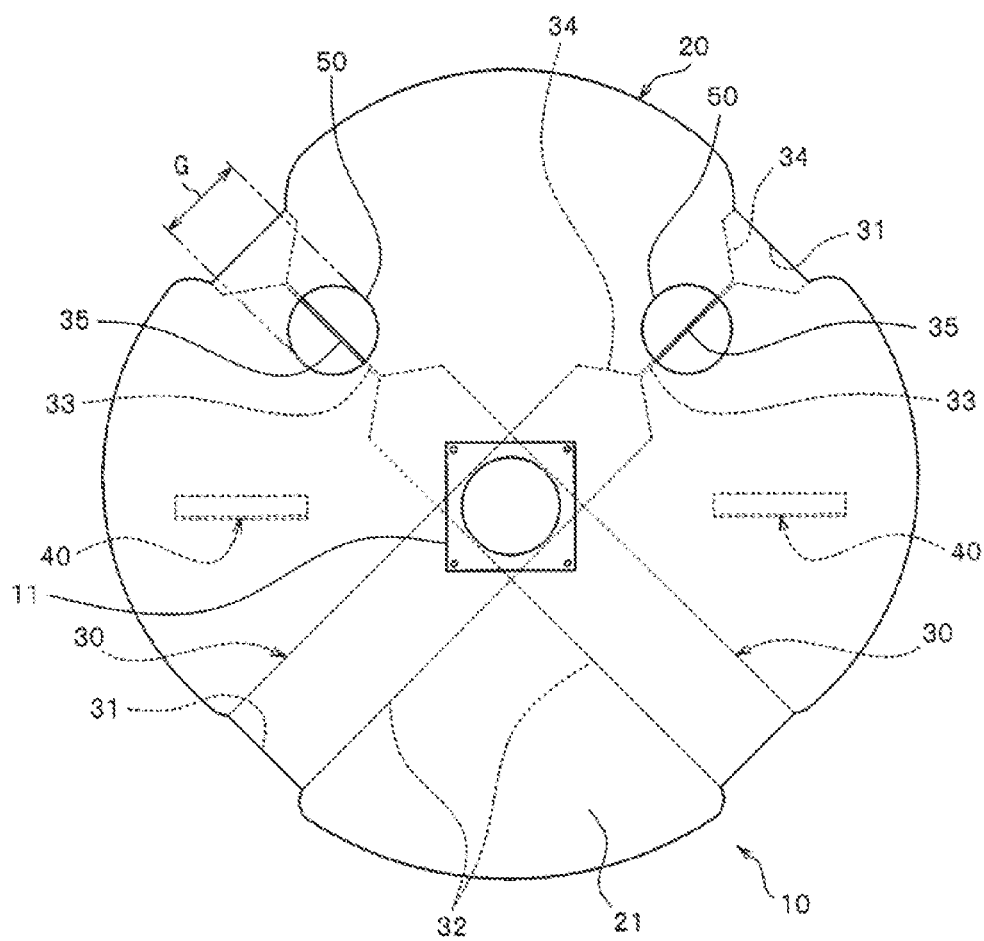
FIG. 3 is a front view of the airbag when the airbag shown in FIG. 1 is viewed from a side opposite to the occupant side.

FIG. 1 is a perspective view schematically showing an appearance of the airbag according to the present example. FIGS. 2 and 3 are a rear view and a plan view of the airbag when the airbag is viewed from an occupant side or a steering wheel side. FIGS. 1 to 3 show a state where the airbag is inflated and deployed.

Regarding the airbag, an up-and-down direction and a right-and-left direction mean an up-and-down direction and a right-and-left direction in a case where the airbag apparatus mounted on the steering wheel is viewed from a driver side. In addition, in a case where the airbag apparatus is viewed from the driver side, the forward direction means a direction toward a far side (steering wheel side) with respect to the airbag apparatus, and the backward direction means a direction toward a near side (driver side) with respect to the airbag apparatus.

Figure 5:
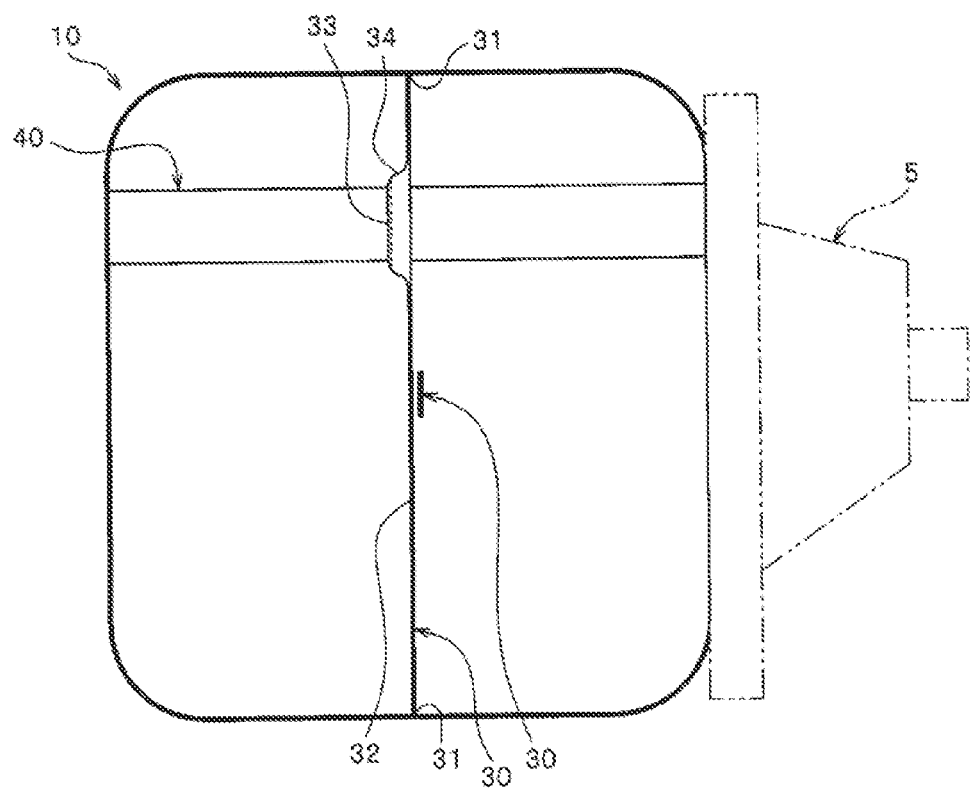
FIG. 5 is a schematic sectional view schematically showing a section of the airbag taken along line V-V shown in FIG. 2.

In the present example, the airbag apparatus is attached to steering wheel 5, at the time of an automobile collision, airbag 10 of the airbag apparatus inflates and deploys toward the backward direction, which is the occupant side, and as inflated and deployed airbag 10 is brought into contact with an occupant, the occupant is protected by being restrained (refer to FIG. 5).

The airbag apparatus has airbag 10 according to the present example, inflator 11 that supplies a gas to airbag 10, and a holding member (retainer) (not shown) that holds airbag 10 and inflator 11. In addition, airbag 10 before inflation is folded in predetermined procedures, and is attached to the holding member in a state where the airbag in this folded form is surrounded and held by a cover body (not shown). In the present invention, configurations of components or members (inflator 11 and the holding member) other than airbag 10, among components or members forming the airbag apparatus, are not particularly limited.

Airbag 10 of the present example has airbag main body 20 formed in a bag shape, first tension member 30 and second tension member 40 which are disposed inside airbag main body 20, an insertion opening portion (not shown) into which a part of inflator 11 is inserted, and two vent holes 50 for discharging a gas flowed in airbag main body 20. In this case, first tension member 30 is a member extending in a direction orthogonal to a forward-and-backward direction when airbag 10 is inflated, and second tension member 40 is a member extending in the forward-and-backward direction when airbag 10 is inflated.

Airbag main body 20 is formed in a bag shape by a single or a plurality of base cloths (panels). When inflated and deployed, airbag main body 20 is formed to have a substantially circular shape or a substantially quadrangular (substantially rounded quadrangular) shape formed to have rounded corners, and to have an appropriate thickness in the forward-and-backward direction, in rear view, which is viewed from a driver's seat side (refer to FIG. 2) or front view, which is viewed from a steering wheel 5 side (refer to FIG. 3).

When airbag main body 20 are inflated and deployed, first tension member 30 and second tension member 40, which are provided in airbag main body 20, are extended and tension occurs in first tension member 30 and second tension member 40. The inflated shape of inflated and deployed airbag main body 20 is regulated by such tension of first tension member 30 and second tension member 40. In the present example, inflated and deployed airbag main body 20 has, due to the regulation by first tension member 30 and second tension member 40 described above, wheel facing surface portion (front surface portion) 21 that faces steering wheel 5, occupant facing surface portion 22 (rear surface portion) that faces the occupant, and outer peripheral surface portion 23 that connects wheel facing surface portion 21 and occupant facing surface portion 22 to each other.

Two vent holes 50 and the insertion opening portion (not shown) of airbag 10 are provided to be disposed in wheel facing surface portion 21 of airbag main body 20 when airbag main body 20 is inflated and deployed. Two vent holes 50 are formed by penetrating the base cloth of airbag main body 20 from an inner surface to an outer surface. In addition, in front view or rear view of inflated and deployed airbag main body 20, each of right and left vent holes 50 is provided at a symmetrical position with a center position in the right-and-left direction as reference, and has a circular shape or a substantially circular shape. In the present invention, places where vent holes 50 and the insertion opening portion are provided, the shape of vent holes 50, and the number of vent holes 50 to be provided are not limited, but can be changed in accordance with the size and the inflated shape of airbag 10.

Inside airbag main body 20, a pair of first tension members 30 and a pair of second tension members 40 are attached. First tension member 30 and second tension member 40 are respectively formed by an elongated and flat belt-shaped base cloth (belt-shaped member) having a constant width, and have flexibility that allows bending.

Herein, a length direction of first tension member 30 means a direction from one end portion toward the other end portion of elongated first tension member 30, and means, for example, a direction in which first tension member 30 extends straight when one end portion and the other end portion of first tension member 30 are extended linearly and straight by being pulled in opposite directions to each other. In addition, a length direction of second tension member 40 means a direction from one end portion toward the other end portion of elongated second tension member 40, just as first tension member 30.

Each first tension member 30 is attached in airbag main body 20 as one end portion and the other end portion of first tension member 30 are fixed to an inner surface of outer peripheral surface portion 23 of airbag main body 20 at different positions from each other.

In this case, one end portion and the other end portion of first tension member 30 are fixed to the inner surface of airbag main body 20 by sewing. In the present invention, a method and means of fixing first tension member 30 to the inner surface of airbag main body 20 are not particularly limited.

As one end portion and the other end portion of first tension member 30 are fixed to outer peripheral surface portion 23 of airbag main body 20 as described above, when airbag main body 20 is inflated and deployed, each first tension member 30 is extended in the direction orthogonal to the forward-and-backward direction, and tension along the length direction of first tension member 30 occurs. Accordingly, the inflated shape of inflated and deployed airbag main body 20 can be regulated in the direction orthogonal to the forward-and-backward direction.

In the present example, in rear view (FIG. 2) or front view (FIG. 3) of inflated and deployed airbag 10, two first tension members 30 are attached in airbag main body 20 in a relationship substantially symmetrical to each other in the right-and-left direction such that first tension members 30 intersect each other at a central portion of airbag main body 20 to form a substantially X shape. In this case, first tension member 30 is disposed such that a belt front surface and a belt back surface of a base cloth forming belt main body portion 32 to be described later face the forward-and-backward direction. As two first tension members 30 are attached to airbag main body 20 as described above, airbag main body 20 can be stably inflated and deployed in a substantially circular shape or a substantially rounded quadrangular shape as described above, for example, to correspond to the shape of a rim portion or a grip portion of steering wheel 5.

First tension member 30 has a pair of belt fixing portions 31 (one end portion and the other end portion of first tension member 30) fixed to outer peripheral surface portion 23 of airbag main body 20, belt main body portion 32 disposed between two belt fixing portions 31, narrow portion 33 which has a dimension in an orthogonal direction smaller than belt main body portion 32 in rear view (FIG. 2) or front view (FIG. 3) of inflated and deployed airbag 10, and tapered portion 34 which has a dimension in the orthogonal direction tapering off from belt main body portion 32 toward narrow portion 33. In the case of the present example, the orthogonal direction means a direction orthogonal to the length direction of first tension member 30 in rear view (FIG. 2) or front view (FIG. 3) of inflated and deployed airbag 10.

Belt main body portion 32 of first tension member 30 is formed to have a dimension in the orthogonal direction (in the case of the present example, a belt width direction parallel to the belt front surface and the belt back surface of first tension member 30) orthogonal to the length direction of first tension member 30, which is set to a constant size, in rear view (FIG. 2) or front view (FIG. 3) of airbag 10. In this case, the dimension of belt main body portion 32 in the belt width direction is set to a predetermined size or larger, which allows, when first tension member 30 is extended in the length direction and tension has occurred, securing strength that does not cause first tension member 30 to be broken due to the tension.

Accordingly, the inflated shape of inflated and deployed airbag main body 20 can be stabilized. In addition, by making the dimension of belt main body portion 32 in the belt width direction large, it becomes easy to secure a large dimension of belt fixing portion 31 of first tension member 30 in the belt width direction as well.

As a result, the fixed area of belt fixing portion 31 with respect to airbag main body 20 can be made large easily, and the fixed strength of first tension member 30 can be improved. Accordingly, the position of first tension member 30 can be stabilized when airbag main body 20 is inflated and deployed, and a function of regulating the inflated shape of airbag main body 20 can be stably carried out. For example, in the case of the present example, belt main body portion 32 is formed such that the dimension of belt main body portion 32 in the belt width direction (orthogonal direction) is made larger than maximum gap G (in this case, the diameter of vent hole 50) of vent hole 50 in the belt width direction, in rear view (FIG. 2) or front view (FIG. 3) of airbag 10.

Figure 4:
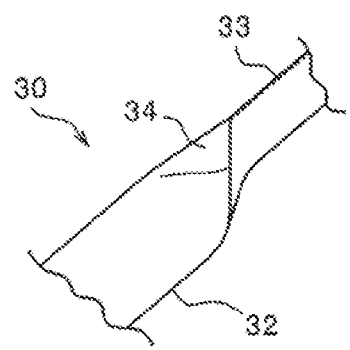
FIG. 4 is a schematic view schematically showing main portions of a tension member provided in the airbag.

As shown in FIG. 4, narrow portion 33 of first tension member 30 is formed such that the base cloth (belt-shaped member) is folded in half in the belt width direction and both end portions of the folded base cloth in the belt width direction are overlapped with and fixed to each other by sewing. Such narrow portion 33 is provided only at a part of first tension member 30, and is formed such that a dimension in the belt width direction (orthogonal direction) is set to a substantially constant size, in rear view (FIG. 2) or front view (FIG. 3) of inflated and deployed airbag 10. A method and means of fixing both end portions of the base cloth in the belt width direction in order to form narrow portion 33 are not particularly limited in the present invention, for example, it is also possible to use bonding.

For example, as shown in FIG. 3, first tension member 30 has overlapping portion 35 disposed at a position overlapping vent hole 50 when an inner side of inflated and deployed airbag main body 20 is viewed from a direction orthogonal to vent hole 50 via vent hole 50. That is, overlapping portion 35 of first tension member 30 means a visible portion of first tension member 30 when the inner side of airbag main body 20 is viewed from an outer side of airbag main body 20 via vent hole 50.

Herein, the direction orthogonal to vent hole 50 means, for example, in a case where vent hole 50 is covered with an imaginary base cloth, a direction along a normal line at a center portion of vent hole 50 or the central portion in the imaginary base cloth. In addition, the direction orthogonal to vent hole 50 also means, for example, in a case where a circumferential edge of vent hole 50 is disposed on one flat imaginary plane, a direction orthogonal to the imaginary plane.

Overlapping portion 35 of first tension member 30 of the present example, which is described above, is disposed within a range of narrow portion 33 provided in first tension member 30. In other words, overlapping portion 35 of first tension member 30 is formed only by narrow portion 33. In this case, in two-dimensional plan view of the inner side of airbag main body 20, which is viewed from the direction orthogonal to vent hole 50 via vent hole 50 (which is the same as front view of airbag 10, which is viewed from the front in the case of the present example, and refer to FIG. 3), overlapping portion 35 is formed such that a dimension in the orthogonal direction which is orthogonal to the length direction of first tension member 30 is smaller than a gap of a portion of vent hole 50, which corresponds to overlapping portion 35, in the orthogonal direction.

Herein, in front view (FIG. 3) of airbag 10, overlapping portion 35 of first tension member 30 and vent hole 50 are shown on a two-dimensional plane. In addition, the direction orthogonal to vent hole 50 and the belt width direction of first tension member 30 are in a positional relationship orthogonal to each other. For this reason, in the case of the present example, in two-dimensional view (front view) when the inner side of airbag main body 20 is viewed from the direction orthogonal to vent hole 50 via vent hole 50, an orthogonal direction orthogonal to a length direction of overlapping portion 35 (first tension member 30) is the same direction as the "belt width direction" of first tension member 30. Unlike the present example, for example, in a case where first tension member 30 is attached to airbag main body 20 in a posture in which the belt width direction of first tension member 30 is inclined with respect to vent hole 50, the orthogonal direction orthogonal to the length direction of overlapping portion 35 shown in front view (two-dimensional view) of airbag 10 is a direction different from the belt width direction, and in this case, the dimension of overlapping portion 35 in the orthogonal direction orthogonal to the length direction of first tension member 30 is a dimension in the orthogonal direction on the two-dimensional plane. In addition, in the case of the present example, entire overlapping portion 35 is formed to be smaller than the maximum gap of vent hole 50 in a direction along the belt width direction (that is, the diameter of vent hole 50).

Even when overlapping portion 35 overlaps vent hole 50 in the direction orthogonal to vent hole 50 (in other words, a direction in which a gas is mainly discharged) as overlapping portion 35 of first tension member 30 is provided in the size described above with respect to vent hole 50, the exhaust performance (exhaust efficiency) of vent hole 50 can be prevented from decreasing due to overlapping portion 35.

In this case, the dimension of overlapping portion 35 (narrow portion 33) in the belt width direction (the orthogonal direction) is set to 50% of maximum gap G of vent hole 50 in the belt width direction or smaller, and preferably 25% or smaller. Accordingly, a decrease in the exhaust performance of vent hole 50 caused by overlapping of first tension member 30 can be more effectively prevented.

Although entire overlapping portion 35 of first tension member 30 of the present example is formed by narrow portion 33, at least a part of overlapping portion 35, preferably a portion which is 50% of overlapping portion 35 or more need only be formed by narrow portion 33 in the present invention, and accordingly, a decrease in the exhaust performance of vent hole 50 can be prevented.

Further, in the present example, in rear view of FIG. 2 in which inflated and deployed airbag 10 is viewed from the driver's seat side, first tension member 30 has temporary overlapping portion 36 that overlaps vent hole 50 disposed on a far side of occupant facing surface portion 22 of airbag main body 20. In this case, temporary overlapping portion 36 of first tension member 30 is provided at substantially the same position and the same range of overlapping portion 35 described above in first tension member 30, and is formed only by narrow portion 33 of first tension member 30 just as overlapping portion 35.

Two second tension members 40 each are attached in airbag main body 20 as one end portion of second tension member 40 in the length direction is fixed to an inner surface of wheel facing surface portion 21 of airbag main body 20 and the other end portion is fixed to an inner surface of occupant facing surface portion 22 of airbag main body 20. In this case, one end portion and the other end portion of second tension member 40 are fixed to the inner surface of airbag main body 20 by sewing. A method and means of fixing second tension member 40 to the inner surface of airbag main body 20 are not particularly limited.

As second tension member 40 is fixed to wheel facing surface portion 21 and occupant facing surface portion 22 of airbag main body 20 as described above, each second tension member 40 is extended in the forward-and-backward direction when airbag main body 20 is inflated and deployed, and accordingly, the inflated shape of inflated and deployed airbag main body 20 can be regulated in the forward-and-backward direction. The stroke of inflating and deploying airbag main body 20 in the forward-and-backward direction is regulated by right and left second tension members 40.

As airbag 10 of the present example has two first tension members 30 that are disposed to be orthogonal to the forward-and-backward direction in a substantially X shape as described above and two second tension members 40 that regulate a stroke in the forward-and-backward direction, as shown in FIG. 5, it is possible to easily form a flat pressure receiving surface of airbag main body 20, which supports the occupant (driver) by coming into contact therewith, and to easily secure a wide area thereof. Accordingly, the occupant restraining performance of the airbag apparatus can be improved. In the sectional view of FIG. 5, in order to show effects of first tension member 30 and second tension member 40 in a manner that facilitates understanding, the section of airbag 10 is schematically shown, and a positional relationship between airbag 10 and steering wheel 5 is briefly shown.

In the present example, in rear view (FIG. 2) or front view (FIG. 3) of inflated and deployed airbag 10, two second tension members 40 are attached at positions where second tension members 40 extending in the forward-and-backward direction do not overlap two first tension members 30 disposed in a substantially X shape. For example, in the case of the present example, two second tension members 40 are attached at a central portion of inflated and deployed airbag 10 in the up-and-down direction and at positions separated to the right and left from a portion where two first tension members 30 intersect. In addition, each second tension member 40 is disposed such that the front surface and the back surface of the belt-shaped base cloth face the up-and-down direction.

In the airbag apparatus including airbag 10 of the present example described above, folded airbag 10 (bag-shaped airbag main body 20) is inflated and deployed as a gas is supplied from inflator 11 into airbag main body 20 of the airbag apparatus when an automobile including the airbag apparatus undergoes a collision.

At the time of inflating and deploying, the inflated shape of airbag main body 20 can be regulated by first tension member 30 and second tension member 40, which are provided in airbag 10, and accordingly, airbag main body 20 can be appropriately and quickly inflated and deployed into a predetermined shape. In addition, when the occupant (driver) has come into contact with inflated and deployed airbag main body 20, the occupant can be stably restrained.

Further, in the present example, since overlapping portion 35 (or temporary overlapping portion 36) of first tension member 30, which is described above, is formed by narrow portion 33 having a small dimension in the belt width direction, even when first tension member 30 is disposed at a position overlapping vent hole 50 at the time of inflating and deploying airbag main body 20, the exhaust performance (exhaust efficiency) of vent hole 50 can be appropriately secured. For this reason, after the occupant is restrained by inflated and deployed airbag 10, a gas in airbag main body 20 can be smoothly discharged from vent hole 50, accordingly, a shock applied to the occupant can be alleviated, and the occupant can be safely protected.

In addition, although a place for setting first tension member 30 provided in airbag 10 and a place for setting vent hole 50 are specifically described in the present example, it is possible to change the place for setting first tension member 30 and the place for setting vent hole 50 in accordance with the form of a vehicle, and the size and the shape of steering wheel 5. In this case, as in the present example, as the overlapping portion (or the temporary overlapping portion) of the tension member (first tension member) overlapping the vent hole is formed by the narrow portion having a small dimension in the belt width direction, the exhaust performance of the vent hole can be prevented from decreasing due to the tension member. For this reason, the place for setting the tension member and the place for setting the vent hole are not restricted (or are unlikely to be restricted) as the vent hold overlaps the tension member, and as a result, a degree of freedom in designing an airbag can be improved.

In the example described above, narrow portion 33 of first tension member 30 is formed by fixing the folded form in the belt width direction. However, in the present invention, the narrow portion of the first tension member is not limited to the form of the example described above, and may be formed in, for example, other forms including a form according to a modification example shown in FIG. 6 and a form according to another modification example shown in FIG. 7 insofar as the dimension of the narrow portion in the belt width direction can be made smaller than the belt main body portion of the first tension member in the end.

Figure 6:
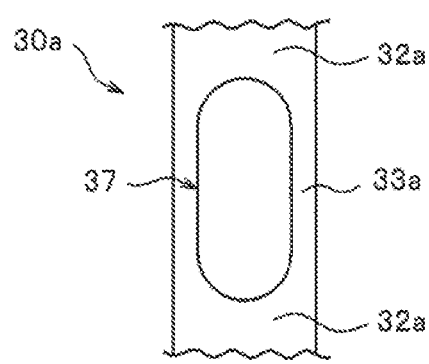
FIG. 6 is a schematic view schematically showing main portions of a tension member according to a modification example.

For example, first tension member 30a according to the modification example shown in FIG. 6 has a pair of belt fixing portions (not shown) fixed to the airbag main body, belt main body portion 32a of which a dimension in the belt width direction is set to a constant size, and narrow portion 33a which has a dimension in the belt width direction smaller than belt main body portion 32a.

Narrow portion 33a of first tension member 30a is formed by providing one opening portion 37 in a central portion of a base cloth forming first tension member 30a in the belt width direction and by making the dimension of a base cloth portion in the belt width direction small Although narrow portion 33a is formed by providing one opening portion 37 in first tension member 30a in the modification example, for example, the narrow portion may be formed by providing a plurality of opening portions in the belt width direction of the first tension member in the present invention.

Figure 7:
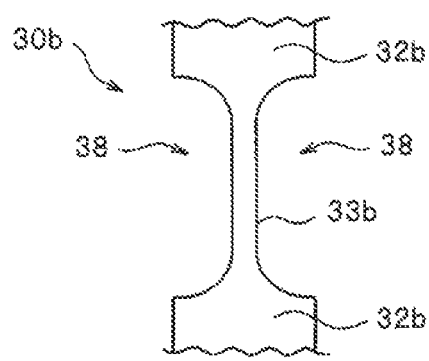
FIG. 7 is a schematic view schematically showing main portions of a tension member according to another modification example.

In addition, first tension member 30b according to another modification example shown in FIG. 7 has a pair of belt fixing portions (not shown) fixed to the airbag main body, belt main body portion 32b of which a dimension in the belt width direction is set to a constant size, and narrow portion 33b which has a dimension in the belt width direction smaller than belt main body portion 32b.

Narrow portion 33b of first tension member 30b is formed as a base cloth forming first tension member 30b has a pair of opening portions 38 provided from both side edges in the belt width direction toward the inner side in the width direction. In the present invention, the narrow portion may be formed by providing the opening portion in only any one of both side edges of the base cloth in the belt width direction.

Even when the airbag apparatus is formed by using the airbag including first tension member 30a shown in FIG. 6 or first tension member 30b shown in FIG. 7, the same effects as those of the airbag apparatus formed by using airbag 10 of the example described above are obtained.

REFERENCE SIGNS LIST 5 steering wheel
10 airbag
11 inflator
20 airbag main body
21 wheel facing surface portion (front surface portion)
22 occupant facing surface portion (rear surface portion)
23 outer peripheral surface portion
30 first tension member
30a, 30b first tension member
31 belt fixing portion
32 belt main body portion
32a, 32b belt main body portion
33 narrow portion
33a, 33b narrow portion
34 tapered portion
35 overlapping portion
36 temporary overlapping portion
37, 38 opening portion
40 second tension member
50 vent hole
G maximum gap of vent hole in orthogonal direction (belt width direction)

What is claimed is:

1. An airbag that is mounted on a vehicle, the airbag comprising:
　a bag-shaped airbag main body that is inflated as a gas flows into the airbag main body;
　at least one tension member that is disposed inside the airbag main body and regulates an inflated shape of the airbag main body; and
　at least one vent hole that is provided in the airbag main body and through which the gas in the airbag main body is discharged,
　wherein in two-dimensional view when an inner side of the inflated and deployed airbag main body is viewed from a direction orthogonal to the vent hole via the vent hole, the tension member has an overlapping portion that is disposed at a position overlapping the vent hole, and in a case where a direction orthogonal to a length direction of the tension member is an orthogonal direction, a dimension of at least a part of the overlapping portion in the orthogonal direction is smaller than a gap of a portion of the vent hole, which corresponds to the overlapping portion, in the orthogonal direction,
　wherein the overlapping portion is included in a narrow portion that has a dimension in the orthogonal direction smaller than other portions in the tension member, and
　the tension member is formed by a belt-shaped member having flexibility, and the narrow portion is formed such that a part of the belt-shaped member is folded in a width direction of the belt-shaped member and both end portions of the belt-shaped member in the width direction are overlapped with and fixed to each other at a folded portion.

2. The airbag according to claim 1,
wherein the entire overlapping portion is formed such that a dimension in the orthogonal direction is smaller than a maximum gap of the vent hole in the orthogonal direction.

3. An airbag that is mounted on a vehicle, the airbag comprising:
a bag-shaped airbag main body that is inflated as a gas flows into the airbag main body;
at least one tension member that is disposed inside the airbag main body and regulates an inflated shape of the airbag main body; and
at least one vent hole that is provided in the airbag main body and through which the gas in the airbag main body is discharged,
wherein in two-dimensional view when an inner side of the inflated and deployed airbag main body is viewed from a direction orthogonal to the vent hole via the vent hole, the tension member has an overlapping portion that is disposed at a position overlapping the vent hole, and in a case where a direction orthogonal to a length direction of the tension member is an orthogonal direction, a dimension of at least a part of the overlapping portion in the orthogonal direction is smaller than a gap of a portion of the vent hole, which corresponds to the overlapping portion, in the orthogonal direction,
wherein the overlapping portion is included in a narrow portion that has a dimension in the orthogonal direction smaller than other portions in the tension member,
the tension member is formed by a belt-shaped member having flexibility, and
the narrow portion is formed by providing an opening portion in a part of the belt-shaped member.

4. The airbag according to claim 3,
wherein the entire overlapping portion is formed such that a dimension in the orthogonal direction is smaller than a maximum gap of the vent hole in the orthogonal direction.

* * * * *